March 17, 1953
H. WARP
2,631,869
IRRIGATING SYSTEM CONDUIT JOINT
Filed June 28, 1946
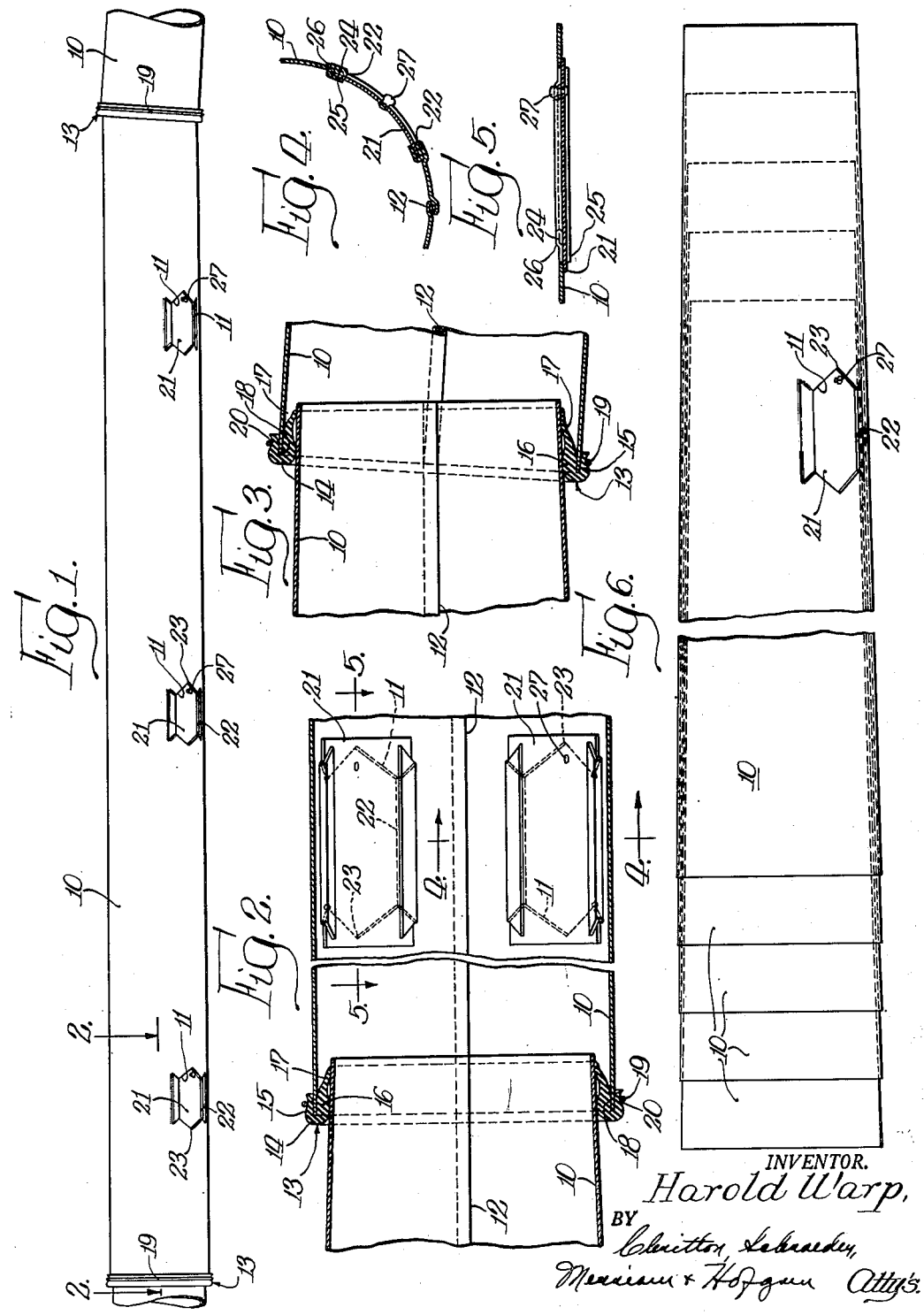
INVENTOR.
Harold Warp,
BY Patented Mar. 17, 1953

2,631,869

UNITED STATES PATENT OFFICE 2,631,869

IRRIGATING SYSTEM CONDUIT JOINT

Harold Warp, Chicago, Ill., assignor to Flex-O-Glass, Inc., a corporation of Illinois Application June 28, 1946, Serial No. 680,335

1 Claim. (Cl. 285—90)

The invention relates generally to an irrigating system and more particularly to water conducting and distributing means for use in an irrigating system.

In irrigating crops that are planted in rows, such as corn, cotton, vegetables, and the like, a sluice is run transversely of the rows and this is then tapped into to obtain a discharge of water down each row. In order to obtain a fairly uniform distribution of water, as well as because of the contour of the land, it is necessary to run these sluices at rather frequent intervals in a field for, if the water has to travel too far down a row, only a trickle reaches the end remote from the sluice, whereas the absorption of water becomes increasingly great as one nears the sluice. At times these sluices have been formed out of dirt built up from the soil of the field itself. It will be appreciated, however, that this, first of all, requires a great deal of labor; secondly, that it interferes with cultivation and harvesting of the crops; and, thirdly, that it is an extremely inflexible system. Attempts have, therefore, in the past been made to perfect various types of troughs, conduits, or pipes to replace the earth ditches. All commercial forms of such troughs, conduits, etc. have, however, proved very heavy and cumbersome still requiring a great deal of labor and time in placing and taking up the conduits, and a great deal of trucking to transport the conduits from place to place as they are used in the irrigation of different fields.

It is an object of this invention, therefore, to provide a new and improved water conduit which is very light in weight yet sturdy enough for the purpose, and which may be economically manufactured by forming the same out of sheet metal.

Another object is to provide conduits having new and improved sealing means for the joints thereof permitting a plurality of conduits to be quickly and readily assembled in continuous end to end relationship with a reasonably fluid-tight joint, and with the conduits at an angle to one another as well as strictly in axial alignment.

Other objects and advantages will become apparent from the following detailed description taken in connection with the accompanying drawings, in which:

Fig. 1 is an elevational view of a plurality of conduits embodying the features of this invention.

Fig. 2 is a horizontal diametrical section taken approximately along the line 2—2 of Fig. 1 to show conduits assembled with their axes in alignment.

Fig. 3 is a view similar to Fig. 2 but showing conduits assembled with their axes at an angle to one another.

Fig. 4 is a fragmentary enlarged detail view taken approximately along the line 4—4 of Fig. 2.

Fig. 5 is a fragmentary slightly enlarged detail view taken approximately along the line 5—5 of Fig. 2.

Fig. 6 is an elevational view showing the conduits telescoped for storing and transporting purposes.

While the invention is susceptible of various modifications and alternative constructions, it is shown in the drawings and will hereinafter be described in a preferred embodiment. It is not intended, however, that the invention is to be limited thereby to the specific disclosure made. On the contrary, it is intended to cover all modifications and alternative constructions falling within the spirit and scope of the invention as defined in the appended claim.

As shown in the drawing by way of an exemplary embodiment, the conducting means is composed of a plurality of conduits or conduit sections 10 which are adapted to be joined end to end so as to form a continuous water conducting means. The conduits or conduit sections 10 may vary in length as conditions may dictate, but it is contemplated, in view of the extreme lightness of the conduits, that they will be of considerable length ranging from twelve to sixteen and twenty or possibly even more feet in length. Formed in each conduit at suitable intervals are a plurality of openings or outlets 11. Preferably two longitudinal rows of such outlets are provided spaced rather closely together and usually controlled by valve means though, as hereinafter more fully made known, such valve elements are not always an essential.

Each conduit 10 as herein shown is tubular and may be cylindrical, rectangular or of almost any other cross sectional shape, though naturally a circular or a rectangular cross sectional area are preferred. The conduit 10 is smaller at one end than the other with such difference in size most conveniently obtained by a uniform taper from end to end. This tubular shape and the tapering construction provide the necessary strength and permit assembly in end to end relationship to form a continuous conducting means and to permit nesting for conservation of space in storing and transporting. The conduit 10 is made from thin sheet metal which is first cut to the desired shape, is further worked upon to form the outlets 11 and associated parts, and is then formed into an ever so slight frusto-conical tube. For example, in an eight inch conduit, the diameter of the smaller end of the conduit is approximately one inch less than the diameter of the larger end of the conduit. The longitudinal edges of the sheet are then formed into a seam 12 of any conventional construction so as to produce the generally cylindrical conduit above mentioned. If the sheet is of steel it is of the order of .015 of an inch thick. If the sheet is of a metal having less tensile strength or less rigidity, thus tending to collapse more readily, a thicker sheet is employed. Such metals usually are lighter than steel so that the weight per unit length of the tube remains approximately the same. It is a feature of this invention to provide a tube which per unit of length weighs less than one-twentieth of the weight of the volume of water carried by a unit of length of the tube when running full.

With a difference of one inch in the diameter between the smaller and the larger end of the conduit 10, there is, of course, considerable room between a pair of conduits when the smaller end of one is inserted to the depth of a few inches only in the larger end of another conduit. Herein means is provided which forms an effective seal and which, moreover, is of such nature that it permits disposition of the conduits at an angle to one another as well as in strict axial alignment. Such a sealing means is herein shown at 13 and comprises an annular ring adapted to fit over the larger end of a conduit and around the smaller end of a conduit in the manner of a collar moving with the smaller end of the conduit as the angular relationship of the conduits being joined is changed. More particularly, the ring is formed of some rubber-like composition be it natural or synthetic rubber or some one of the many plastics which have been developed to have rubber-like characteristics.

More specifically the joining or sealing ring 13 comprises a radially extending base portion 14 from which extends longitudinally an outer lip-like portion 15. Inwardly of the portion 15 and also extending longitudinally in the same direction is a collar portion 16. The radial thickness of the collar portion 16 is such as to fill the annular space between the large end of a conduit and the small end of another conduit inserted therein, and in practice and for a conduit averaging eight or ten inches in diameter has a radial thickness in the order of one-half an inch. The collar portion 16 terminates in a lip or sleeve portion 17 of considerable length which normally has an internal diameter smaller than the thicker part of the collar portion 16 but stretches as a tube is inserted so as to encompass the tube very tightly and seal the joint at that point against leakage even when the conduits are placed at an angle relative to one another. The outer lip portion 15 and the collar portion 16 lie very closely adjacent one another to form an annular fissure 18 in which the larger end of a conduit is adapted to be received in fluid-tight relationship. The ring may, if desired, be stiffened and reinforced by the incorporation therein of a wire 19 embedded in the lip portion 15 or received in an external groove 20 formed in the lip portion. It is believed that it will be readily appreciated that conduits may be assembled, as shown in Fig. 2, that is, in substantially axial alignment, or they may be assembled as shown in Fig. 3 with one disposed at an angle to the other. In either position of the conduits, but particularly when disposed at an angle to one another, the lip portion 17 of the collar 16, by moving with the conduit, continues to surround the conduit in a fluid-tight relationship with the ring yielding in the thicker collar portion 16 to make possible such angular displacement of the conduits without breaking the seal.

The rows of outlets 11 are, as stated, placed relatively close together. This has two advantages. The first is that when the conduit is placed with the outlets as shown in Fig. 1 they will be comparatively close to the ground and thereby reduce to a minimum the washing away of ground which would result if the water were discharged from any great height. The second advantage is that, when it is desired to use a conduit for conducting water to the exclusion of distributing it, the conduit need merely be turned with the outlets at the top. Since the conduits seldom run full of water, there will be no discharge through the outlets even though there may be no valves for the outlets because the outlets will be above the level of the water.

It is preferable, however, to provide valves for the outlets in order that the quantity discharged through each outlet may be controlled. Accordingly, each outlet 11 is provided with a valve element 21, generally rectangular and composed of thin but resilient metal sheet. Each valve element, moreover, in normal unrestrained condition, has a curvature in a transverse direction slightly greater than that of the conduit where the openings 11 are formed. Thus if the conduit 10 has a rectangular cross section, the valve element 21 is slightly curved, but, if the conduit is cylindrical, the valve element will be curved to have a shorter radius than it has in its restrained position in Fig. 4. This construction functions to improve the seal which is effected by the ends of the valve element as will presently become more apparent.

The valve element is mounted for sliding movement and herein guideways for the valve element are provided in a manner economical of material and labor. The outlet is provided with two straight and parallel edges 22 and with pointed ends 23. The portion of the conduit displaced by the outlet 11 is not completely severed and thrown away, but is utilized to form the guideways for the valve element 21. To that end, the conduit at each outlet is cut at the ends of the outlet and along a line connecting the points of the ends of the outlet. Each of the trapezoids thus formed is folded back against the inside of the conduit about the longitudinal edge 22 of the outlet where the trapezoid is still integral with the conduit to form one side or leg 24 of a U-shaped guideway. The trapezoid is then folded back upon itself to form the remaining leg or side 25 of the guideway, the sides 24 and 25 being spaced the thickness of the valve element 21. In order that the inner surface of the leg 24 of the guideway may be flush with the inner surface of the conduit at the ends of the outlets 11, the conduit is at 26 offset outwardly by the thickness of the leg 24. It is believed readily apparent that a valve element seeking to assume its normal curvature but having its longitudinal edges restrained by the guideways will at its ends bear the more tightly against the conduit. A knob 27, secured near one end of the valve element 21, is provided for actuation of the valve element from the exterior of the conduit.

It is believed apparent from the foregoing that I have perfected a conduit suitable for use in irrigating systems which has many advantages and patentable advances over the prior art. The conduits, made as they are from very thin sheet material, are light and a single workman can thus carry several at one time, thereby greatly facilitating and speeding up the running of a continuous conducting means across a field. For the same reason, a great many may be transported in a single truck load. The separate conduits are readily and quickly joined simply by inserting the end of one in the end of the other. There is a total absence of any locking means that requires tightening or inserting of screws or bolts and, in fact, of any manipulation whatsoever save the one operation of inserting one tube within the other. Similarly, the conduits may be disassembled equally readily and yet the sealing means 13 is such that the conduits are firmly held joined together when in use. The construction also permits of convenient and compact storage. When the conduits are to be stored, the sealing means 13 are removed, leaving the conduits with no obstructions or deformities at either end. The conduits may then be telescoped as shown in Fig. 6, the substantial taper permitting the conduits to be received one within the other to a considerable extent despite the presence of the valve elements 21. The conduits may be economically manufactured for a minimum weight of material is employed, a low priced form of material is employed, and most of the operations are simple stamping and forming operations carried out, for the most part, on a flat sheet.

I claim as my invention:

A joint for tubular conduits which are smaller at one end than at the other comprising an annular ring of rubber-like material having a radially extending base portion of considerable radial thickness, an outer longitudinally extending lip-like portion, and an inner longitudinally extending collar portion of greater radial thickness, at the area of attachment to said base portion, than said outer portion and terminating in a sleeve portion, said outer and inner portions lying closely adjacent to form therebetween an annular fissure for the reception therein of the larger end of one conduit and said inner portion being of an internal diameter tightly to surround the smaller end of a conduit inserted into the first mentioned conduit, the collar portion being of a radial thickness to fill the space between the conduits to constitute a fulcrum and the sleeve portion tapering to a thin lip hugging the smaller end of a conduit and spaced from the larger end of a conduit and projecting longitudinally well beyond said outer lip-like portion.

HAROLD WARP.

REFERENCES CITED

The following references are of record in the file of this patent:

UNITED STATES PATENTS

| Number | Name | Date |
| --- | --- | --- |
| Re. 14,081 | Linxweiler | Mar. 7, 1916 |
| 214,991 | Coler | May 6, 1879 |
| 1,281,905 | Broschart | Oct. 15, 1918 |
| 2,278,074 | Hauf | Mar. 31, 1942 |
| 2,484,407 | Greenbaum | Oct. 11, 1949 |

FOREIGN PATENTS

| Number | Country | Date |
| --- | --- | --- |
| 838,101 | France | Feb. 28, 1939 |